April 3, 1962 J. G. SVRCHEK ET AL 3,028,257
METHOD OF APPLYING HEAT-REACTIVE COPOLYMER ONTO A SURFACE
Filed March 23, 1959
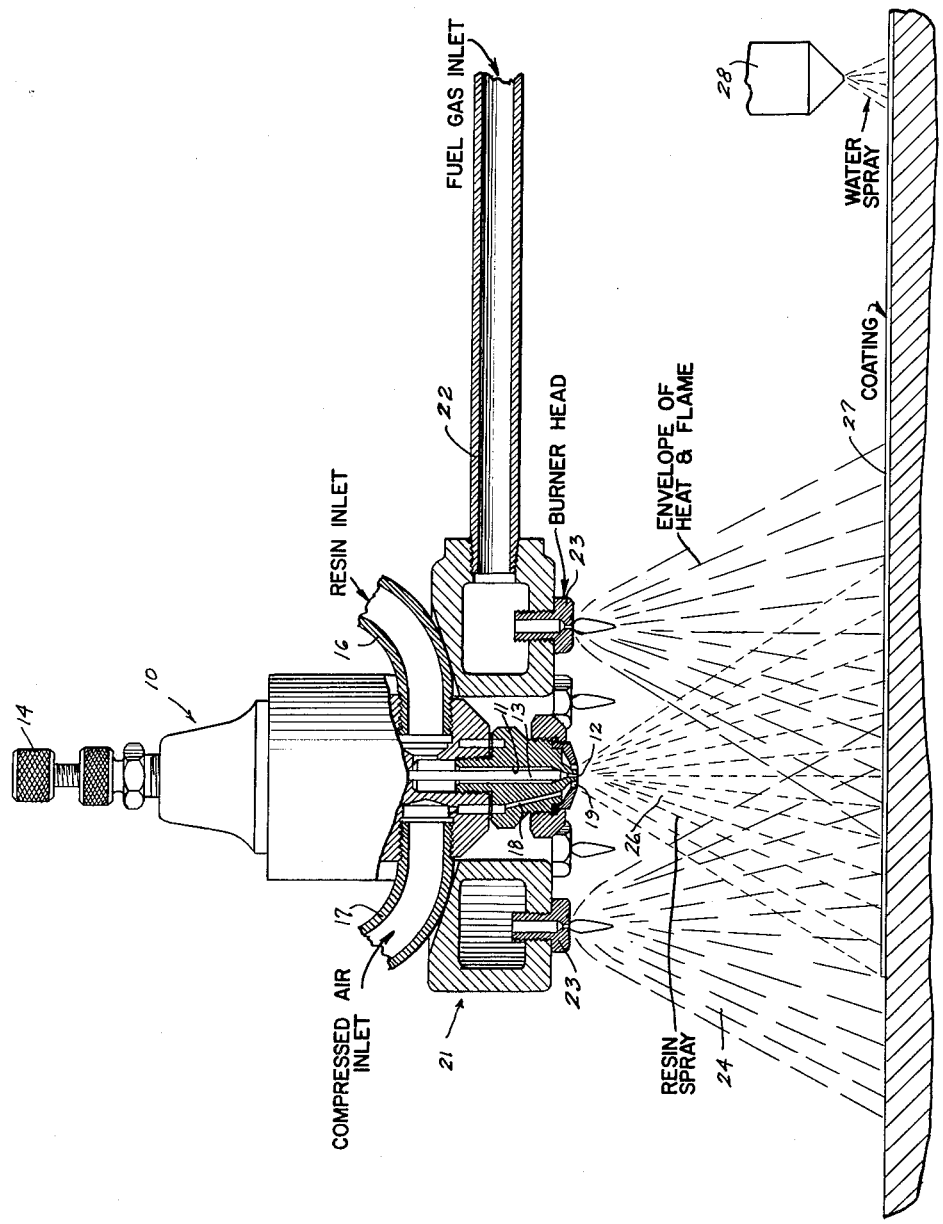
Inventors
Joseph G. Svrchek
Walter S. Rae
by Hill, Sherman, Meroni, Gross & Simpson Attys.

3,028,257
METHOD OF APPLYING HEAT-REACTIVE COPOLYMER ONTO A SURFACE
Joseph G. Svrchek, Downers Grove, Ill., and Walter S. Rae, Houston, Tex., assignors to Dearborn Chemical Company, Chicago, Ill., a corporation of Illinois
Filed Mar. 23, 1959, Ser. No. 801,181
5 Claims. (Cl. 117—46)

The present invention is directed to an improved method and apparatus for the application of heat-reactive polymers and has particular reference to the application of non-friable, heat polymerizable coatings which have heretofore been applied only with great difficulty.

The method of the present invention is applicable generally to heat reactive polymers which, because of their nature, cannot be conveniently applied onto surfaces with adequate thickness.

The process and apparatus of the invention are particularly applicable to oily copolymers of conjugated diolefins having from four to six carbon atoms per molecule, such as butadiene, isoprene, dimethyl butadiene, methyl pentadiene, and piperylene with ethylenically unsaturated monomers such as styrene, alkyl styrenes, acrylonitrile methacrylonitrile, methyl acrylate, methyl methacrylate vinyl isobutyl ether, methyl vinyl ketone, and isopropenyl methyl ketone. Generally, the copolymer contains from about 60 to 95% of the diolefin and from 5 to 40% of the ethylenically unsaturated monomer.

In the past, the application of such copolymers with a thickness sufficient for commercial usage (usually on the order of 8 to 12 mils) has been carried out only with great difficulty. Normally, the material is combined with a hydrocarbon and/or alcohol diluent and applied carefully over the surface to be coated by spraying or brushing. Then, heat is applied in order to finish the curing of the copolymer while eliminating the diluent. Even when a great deal of care is employed in this procedure, however, the results are not always satisfactory. In order to get a commercially acceptable thickness of coating, the process has to be repeated many times as each successive application of the copolymer results in the production of a film measuring only one or two mils in thickness. Unless great care is taken in the application of the heat to the deposited coating, the diluent becomes entrapped in the copolymer, causing blisters to occur in the coating. This process of applying successive coatings, with careful elimination of the diluent becomes expensive and time consuming.

Accordingly, an object of the present invention is to provide an improved method for the application of heat-reactive coatings which will apply a sufficiently thick coating in a continuous process.

A further object of the invention is to provide an improved method for applying butadiene-styrene copolymers to insure complete elimination of the diluent, thereby avoiding the formation of blisters in the coating.

Still another object of the invention is to provide a method for simultaneous application, curing, and diluent removal in the application of heat-reactive coatings.

Another object of the invention is to provide an improved apparatus for the application of coatings of the type described.

While the process and apparatus of the present invention are applicable to heat-reactive resinous coatings generally, they find particular applicability to the application of butadiene-styrene copolymers containing about 75 to 85% butadiene and 15 to 25% styrene. Such copolymers can be prepared by reaction of the monomers in the presence of sodium and from 2 to 10% of ditertiary butyl peroxide (U.S. Patent No. 2,772,254 to Gleason et al.). They may contain hardness modifying agents such as maleic acid, fumaric acid, thioglycolic acid, thiosalicylic acid, mercaptohthalic acid, itaconic acid, mesaconic acid, citraconic acid, acrylic acid, or esters thereof in small amounts (U.S. Patent No. 2,733,267 to Koenecke). They may contain small amounts of alkylated phenols (U.S. Patent No. 2,767,229 to Gleason). The reaction mixture may also contain ether promoters (U.S. Patent No. 2,768,-984 to Mertzweiller et al.). The copolymers may also contain modifiers such as acrylic nitriles, alkyl acrylates, vinyl acetate, vinyl ketones, cinnamaldehyde, thioglycolic acid, and the like (U.S. Patent No. 2,683,162 to Gleason). They may contain bodying agents such as maleic anahydride (U.S. Patent No. 2,652,342 to Gleason).

For further discussion of these copolymers, and to various methods which can be used in their production, reference is invited to the following United States patents:

| | |
|---|---|
| 2,646,418 | Lang |
| 2,672,425 | Gleason et al. |
| 2,712,562 | Leary et al. |
| 2,753,385 | Gleason |
| 2,762,851 | Gleason |
| 2,826,618 | Gleason |

We have now found that non-friable heat-reactive materials can be applied as a thick coating in a continuous process by forming the partially polymerized material into a spray and then passing the spray into a flame jet directed at the object to be coated. We have had particularly good results by using an oxy-acetylene torch but the process can be likewise carried out with other flame guns such as air-acetylene, propane-air, propane-oxygen, natural gas-air, and the like.

Where the viscosity of the copolymer is adequately low, the spray can be produced by injecting the liquid under pressure through a nozzle, with or without a compressed air stream for atomizing the liquid. In most cases, however, a diluent may be required to bring the copolymer to the required consistency for spraying.

As diluents, we employ materials which are readily volatilized or burned as the mixture of diluent and polymer is injected into the flame zone. Alkanols such as isopropanol and ethanol are particularly preferred, although other diluents such as a petroleum naphtha having a boiling range of about 90 to 120° C., straight run mineral spirits having a boiling range of about 150 to 200° C., or specific hydrocarbons such as butane, pentane, benzene, toluene, xylene, cyclohexane, butenes, pentenes or similar hydrocarbons may be employed. Generally, a sufficient amount of the diluent is added to provide a flowable consistency to the copolymer so that the copolymer can be handled easily in the particular spraying equipment employed. As a general rule, where diluents are required we suggest using about 50 to 150 parts by weight of the diluents to every 100 parts by weight of the copolymer.

A further description of the present invention will be made in conjunction with the attached sheet of drawings, which illustrate one form of the invention.

As shown in the drawings:

In the drawing, reference numeral 10 indicates generally a flame spraying head having an axial passageway 11 terminating in a reduced diameter orifice 12. A needle valve 13, axially movable by adjustment of a thumb screw 14 adjusts the fluid flow into the orifice 12. The resin to be sprayed is introduced into the passageway 11 from a conduit 16. Where a diluent has been added to the copolymer, the liquid is introduced into the spray device at a temperature above the flash point of the diluent, so that the diluent is eliminated immediately upon issuing from the orifice 12.

To assist in dispersing the spray appearing at the orifice 12, compressed air entering through a conduit 17 is directed through a plurality of angularly disposed passages 18 which discharge the air through a circular slot 19 surrounding the orifice 12.

The fuel gas mixture is introduced into a burner head manifold 21 through a conduit 22. The manifold 21 has circumferentially spaced burner jets 23 at which the fuel gas is burned to provide an envelop of flame and heat generally indicated at numeral 24 in the drawings.

The dispersed spray 26 issuing from the orifice 12 intercepts the envelop 24 and the volatilized diluent, if flammable, is burned off.

In starting up the equipment, the combustible mixture of fuel gas and oxidizing gas is ignited and the ratio of the two gases is adjusted to produce a proper type of flame. Then, the liquid mixture of copolymer and diluent is flowed through orifice 12 under a slight positive pressure. In issuing through the orifice 12, the mixture is broken up into a spray by the flashing of the diluent and the high temperature of the flame serves to burn the flammable diluent. The copolymer is apparently rendered partially molten by the heat of the flame and is deposited upon a moving work surface 27 in a tightly adherent condition. At the same time, the temperature of the flame is sufficiently high to finish the curing of the applied coating, the curing temperature for copolymers of this type being normally in the range of about 200 to 600° F. Since the diluent is volatilized immediately, the spray can be directed at the surface 27 for a sufficiently long time to build up a coating of 8 to 12 mils without difficulty by consecutive applications in a continuous process.

After the application of the coating, the coated surface passes beneath a water spray device 28 where the cured coating is cooled to temperatures at which it can be handled readily.

Particularly good results are obtained in the process if the workpiece to be coated is preheated to a temperature of about 100 to 150° F. before the coating is applied.

The following is a specific example of the process involved in producing coatings according to the present invention.

Fifty parts of a commercially available butadiene-styrene copolymer containing about 80% butadiene and about 20% styrene, and having a molecular weight in the range from 8000 to 10,000 in combination with 50 parts by weight of a diluent consisting of 3 parts of "Solvesso 100" (an aromatic solvent containing xylenes and toluene) and 1 part isopropanol were sprayed through the spray gun assembly shown in the drawings. The material was preheated to 200° F. and introduced at a pressure of 60 p.s.i. Atomizing air was introduced at a pressure of 65 p.s.i. The fuel gas was a mixture of acetylene (12 p.s.i.) and oxygen (30 p.s.i.).

The spray gun was located about 6 inches from the surface of a metal pipe. The resin spray was completely surrounded by the flame jets, thereby preventing escape of the volatile and combustible diluent. The resin particles were completely stripped of diluent by burning, and the resin particles impinged on the pipe surface where they coalesced into a continuous polymerized film of the resin.

We claim as our invention:

1. The method of applying a heat reactive copolymer of butadiene and styrene containing from about 75 to 85% butadiene and from about 15 to 25% styrene which comprises adding a flammable liquid diluent to said copolymer forming a flame zone in closely spaced relation to a surface to be coated, heating the resulting mixture to a temperature above the flash point of said diluent, and directing a spray of said copolymer in partially polymerized form through said zone and onto said surface, the temperature of the flame and the residence time of the spray in said flame zone being sufficient to finish curing the copolymer.

2. The method of applying a heat reactive copolymer of butadiene and styrene onto a surface which comprises adding a flammable liquid diluent to said copolymer, heating the resulting mixture to a temperature above the flash point of said diluent, and thereafter spraying said mixture through an envelope of flame and heat directed at said surface, the temperature of the flame and the residence time of the spray in said flame being sufficient to finish curing the copolymer.

3. The method of applying a heat reactive copolymer of butadiene and styrene to a surface which comprises adding a flammable liquid diluent to said copolymer, heating the resulting mixture to a temperature above the flash point of said diluent, passing said mixture through a restricted orifice, directing an air stream about said orifice to form a dispersed spray from the material issuing from said orifice, and directing the spray through an envelope of flame and heat directed at said surface, the temperature of the flame and the residence time of the spray in said flame being sufficient to finish curing the copolymer.

4. The method of applying a partly polymerized heat reactive copolymer of a conjugated diolefin and an ethylenically unsaturated monomer onto a surface which comprises adding a flammable liquid diluent to said copolymer, heating the resulting mixture to a temperature above the flash point of said diluent, and thereafter spraying said mixture through an envelope of flame and heat directed at said surface, the temperature of the flame and the residence time of the spray in said flame being sufficient to finish curing the copolymer.

5. The method of applying a partly polymerized copolymer of a conjugated diolefin and an ethylenically unsaturated monomer onto a surface which comprises adding a flammable liquid diluent to said copolymer, heating the resulting mixture to a temperature above the flash point of said diluent, atomizing the resulting mixture with an air stream, and directing the resulting spray through an envelope of flame and heat directed at said surface, the temperature of the flame and the residence time of the spray in said flame being sufficient to finish curing the copolymer.

References Cited in the file of this patent

UNITED STATES PATENTS

| | | |
|---|---|---|
| 1,609,465 | Day | Dec. 7, 1926 |
| 2,320,255 | Bacon et al. | May 25, 1943 |
| 2,438,471 | Ball | Mar. 23, 1948 |
| 2,746,883 | Powers | May 22, 1956 |
| 2,848,819 | Schoenfeld | Aug. 26, 1958 |

FOREIGN PATENTS

| | | |
|---|---|---|
| 560,491 | Great Britain | Apr. 6, 1944 |
| 566,064 | Great Britain | Dec. 12, 1944 |
| 214,820 | Australia | May 6, 1958 |